(12) United States Patent
Gentieu et al.

(10) Patent No.: US 6,975,395 B1
(45) Date of Patent: Dec. 13, 2005

(54) HANDHELD OPTICAL CHANNEL PERFORMANCE MONITOR AND OPTICAL SPECTRUM ANALYZER

(75) Inventors: Paul Gentieu, Sunnyvale, CA (US); Craig Howard, Belmont, CA (US); Farhad Iryami, Millbrae, CA (US)

(73) Assignee: Finisar Corporation, Sunnyvale, CA (US)

( * ) Notice: Subject to any disclaimer, the term of this patent is extended or adjusted under 35 U.S.C. 154(b) by 36 days.

(21) Appl. No.: 10/318,286

(22) Filed: Dec. 11, 2002

Related U.S. Application Data

(63) Continuation of application No. 10/137,572, filed on Apr. 30, 2002, now abandoned.
(60) Provisional application No. 60/365,987, filed on Mar. 18, 2002.

(51) Int. Cl.$^7$ .......................... G01J 3/28; H04B 10/08
(52) U.S. Cl. .................. 356/326; 356/402; 398/25; 398/26; 398/31
(58) Field of Search ............................. 356/326, 402, 356/328, 405, 406, 407; 250/226; 398/25, 26, 29, 31, 33

(56) References Cited

U.S. PATENT DOCUMENTS 6,362,886 B2 * 3/2002 Ruevski et al. .............. 356/402

\* cited by examiner

*Primary Examiner*—Layla G. Lauchman
(74) *Attorney, Agent, or Firm*—Worman Nydegger

(57) ABSTRACT

A handheld optical unit is disclosed to measure optical characteristics of an optical input. A personal digital assistant is mounted to a housing to serve as a host computer for an optical spectrum analyzer disposed within the housing.

32 Claims, 8 Drawing Sheets

HANDHELD OPTICAL CHANNEL PERFORMANCE MONITOR AND OPTICAL SPECTRUM ANALYZER

RELATED APPLICATIONS

This application is a continuation of U.S. patent application Ser. No. 10/137,572, entitled "Handheld Optical Channel Performance Monitor And Optical Spectrum Analyzer," filed Apr. 30, 2002 now abandoned; which claims priority under 35 U.S.C. § 119(c) to U.S. patent application Ser. No. 60/365,987, entitled "Handheld Optical Channel Performance Monitor And Optical Spectrum Analyzer," filed Mar. 18, 2002; the contents of both of which are hereby incorporated by reference in their entirety in the present patent application.

BACKGROUND OF THE INVENTION

1. Field of the Invention

The present invention relates generally to compact optical channel performance monitors and spectrum analyzers.

2. Description of Background Art

Optical channel performance monitors (OCPMs) are of interest in a variety of telecommunication applications, such as wavelength divisional multiplexed (WDM) networks. The term "OCPM" is a comparatively new term commonly used to describe an optical monitoring apparatus capable of performing a variety of different measurement functions. OCPMs are versatile modules that may be used to emulate the function of a variety of test equipment, such as an optical channel monitor, optical performance monitor, optical power meter, or an optical spectrum analyzer. As one example, an OCPM system may be used to display the time-averaged power in individual wavelength channels, display an optical spectrum of one or more channels, display data for calculating the center wavelength of optical signals, or calculate the optical signal-to-noise ratio of individual channels.

An OCPM typically includes a grating to disperse input light into its component wavelengths. The light at a selected wavelength is detected by an optical detector. An OCPM typically includes its own signal processor to process data locally, although a host computer may perform additional data processing of raw data.

Typically, an OCPM system includes an OCPM and a local computer (e.g., a personal computer) to display data generated by the OCPM in a useful form. The local computer may also be used to provide control signals to the CPM.

One drawback of conventional OCPM systems is that they are larger and heavier than desired. A conventional OCPM system may not provide an optical spectrum analyzer function. The total size of the OCPM and its associated host computer occupies a significant amount of test-bench area. Additionally, the bulk a conventional OCPM makes it more difficult than desired to move the OCPM to a new location. Generally speaking, the size, weight, and other limitations of conventional OCPMs means that they cannot easily be used as field-test instruments.

Therefore, what is desired is a compact OCPM system.

SUMMARY OF THE INVENTION

The present invention generally comprises a handheld device for analyzing optical power characteristics. It includes a housing that is shaped to be held by a human hand. An optical spectrum analyzer is disposed within the housing. The housing is configured to permit a personal digital assistant (PDA) to be mounted to the housing to serve as a host computer and user interface for the optical spectrum analyzer. The optical spectrum analyzer analyzes optical power levels of an optical input at a plurality of wavelengths and outputs spectral data to the personal digital assistant via a signal connector.

The PDA may be used to display an optical characteristic of the optical input. In one embodiment, the personal digital assistant is configured to display optical power levels of selected channels, optical signal-to-noise ratio of selected channels, wavelength of signals, or an optical spectrum of selected channels. Additionally, the personal digital assistant may be configured to output an alarm if a spectral characteristics is out of bounds of a preselected range.

Additionally, the PDA may be used to perform other functions on the spectral data, such as storing the spectral data or transferring it to other devices.

In one embodiment, the optical spectrum analyzer includes a grating to spatially disperse light as a function of wavelength, a detector array receiving the spatially dispersed light, an analog-to-digital converter to form digital data indicative of the intensity of dispersed light on each detector in the array, and a digital signal processor to calculate optical power levels as a function of wavelength for the input light. The optical spectrum analyzer may be configured as an optical channel performance monitor for monitoring a plurality of wavelength channels.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict a preferred embodiment of the present invention for purposes of illustration only. One of skill in the art will readily recognize from the following discussion that alternative embodiments of the structures and methods disclosed herein may be employed without departing from the principles of the claimed invention.

DETAILED DESCRIPTION OF THE PREFERRED EMBODIMENTS

The present invention generally comprises a handheld optical analyzer module employing a personal digital assistant (PDA) as a host computer. PDAs are manufactured by a variety of companies. PDAs, such as those manufactured by Palm Inc, of Santa Clara, Calif., are typically handheld units that include a display screen (e.g., a touch screen), a user input interface (e.g., buttons and a handwriting recognition portion of a touch-screen), and a microprocessor and memory for storing and running: software applications. PDAs are also sometimes known as "handheld" computers, such that hereinafter it will be understood that as used in this patent application a PDA includes a handheld computer.

Figure 1A:
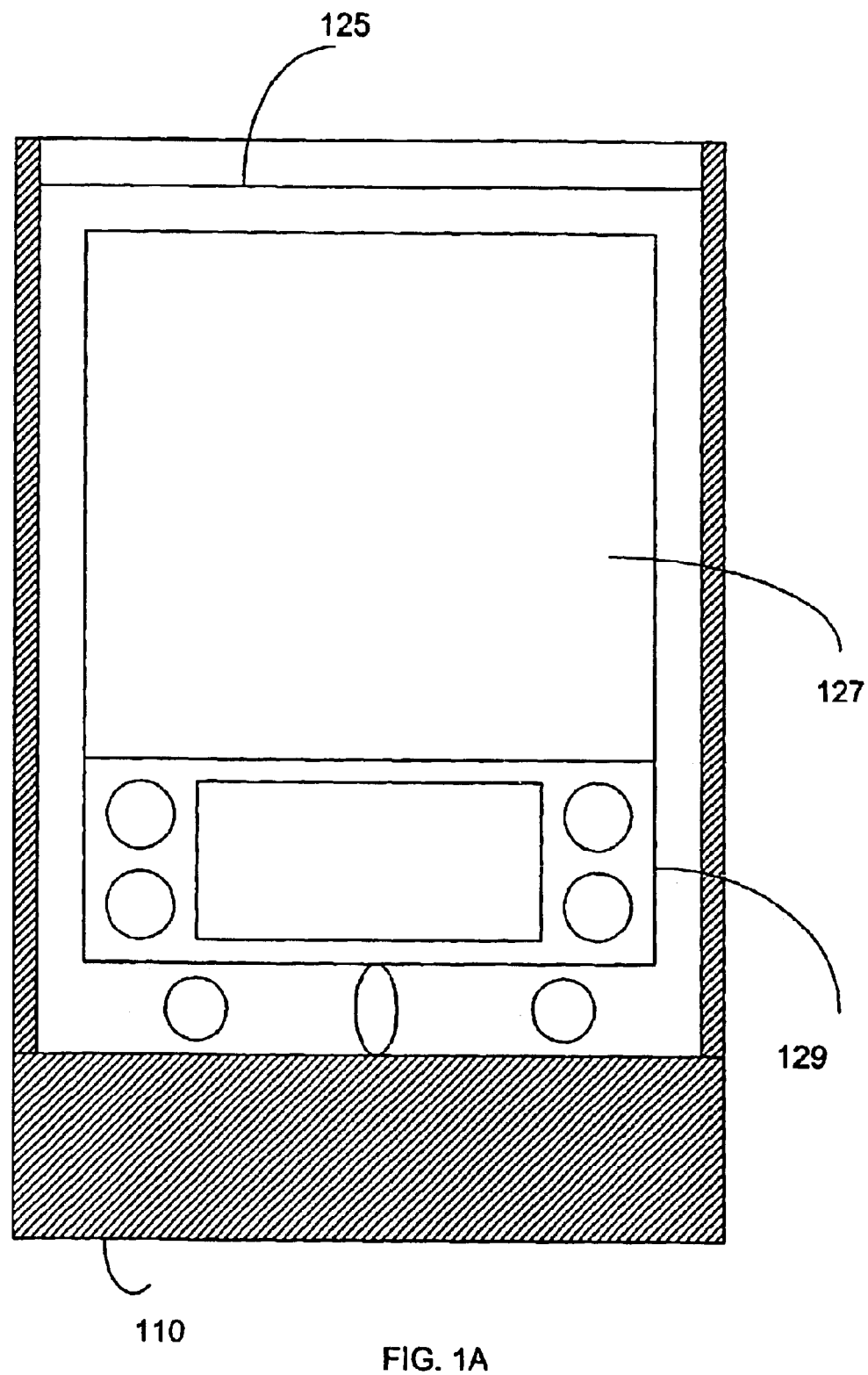
FIG. 1A is front view of an assembled handheld optical analyzer of the present invention.
Figure 1B:
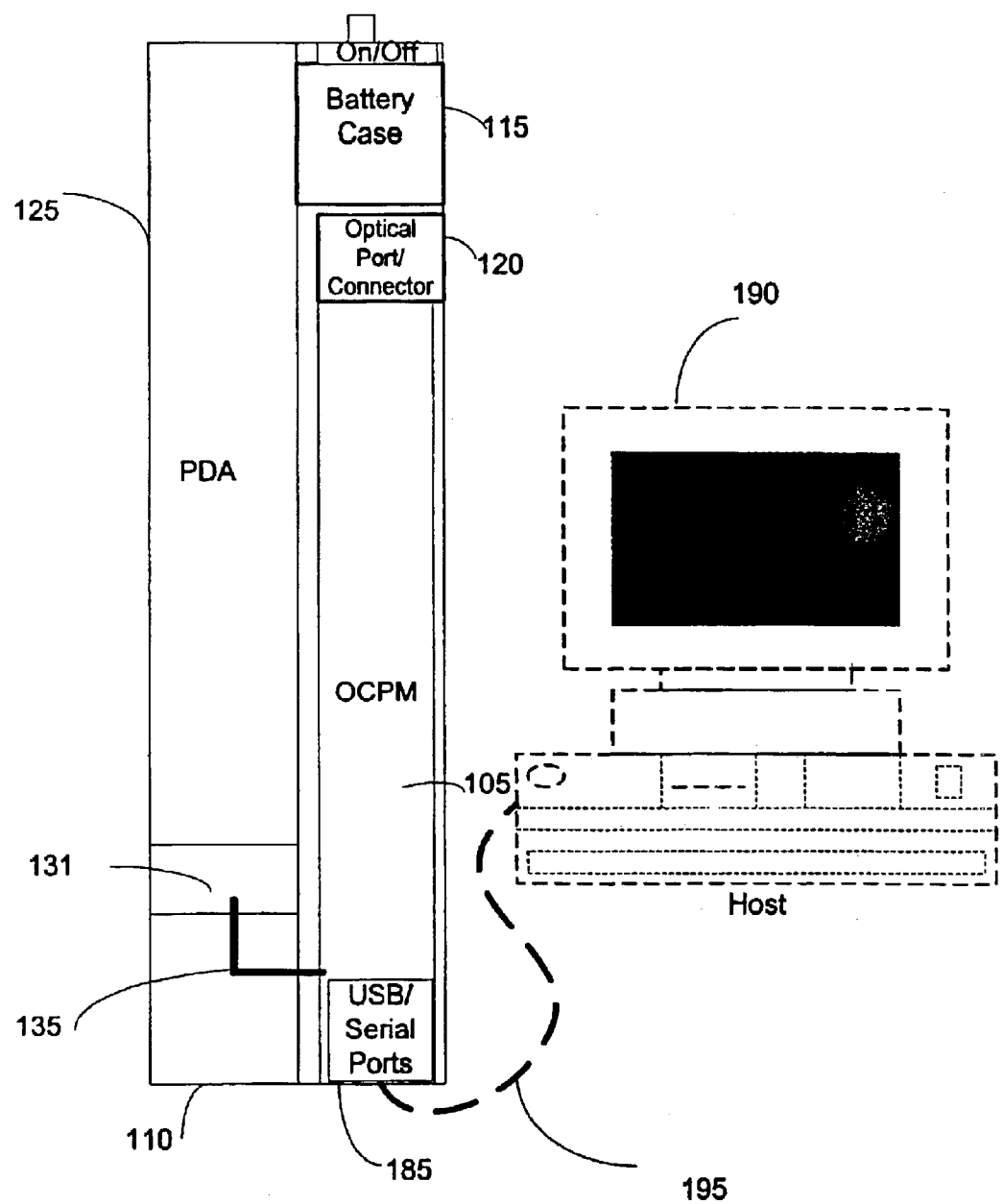
FIG. 1B is a side view of the handheld optical analyzer of FIG. 1A.
Figure 1C:
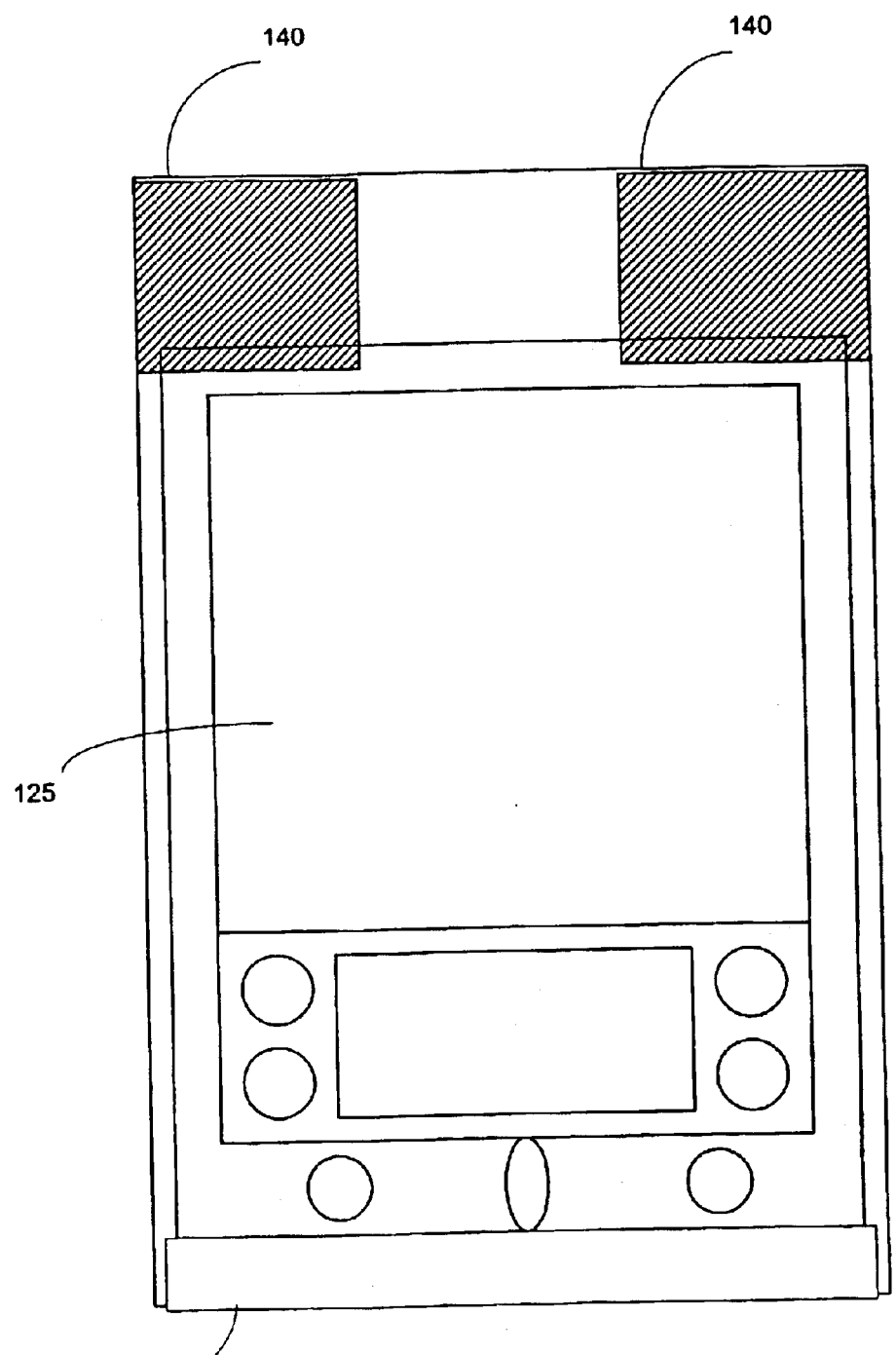
FIG. 1C is a front view of a second embodiment of an optical spectrum analyzer of the present invention, showing an alternate housing design.
Figure 1D:
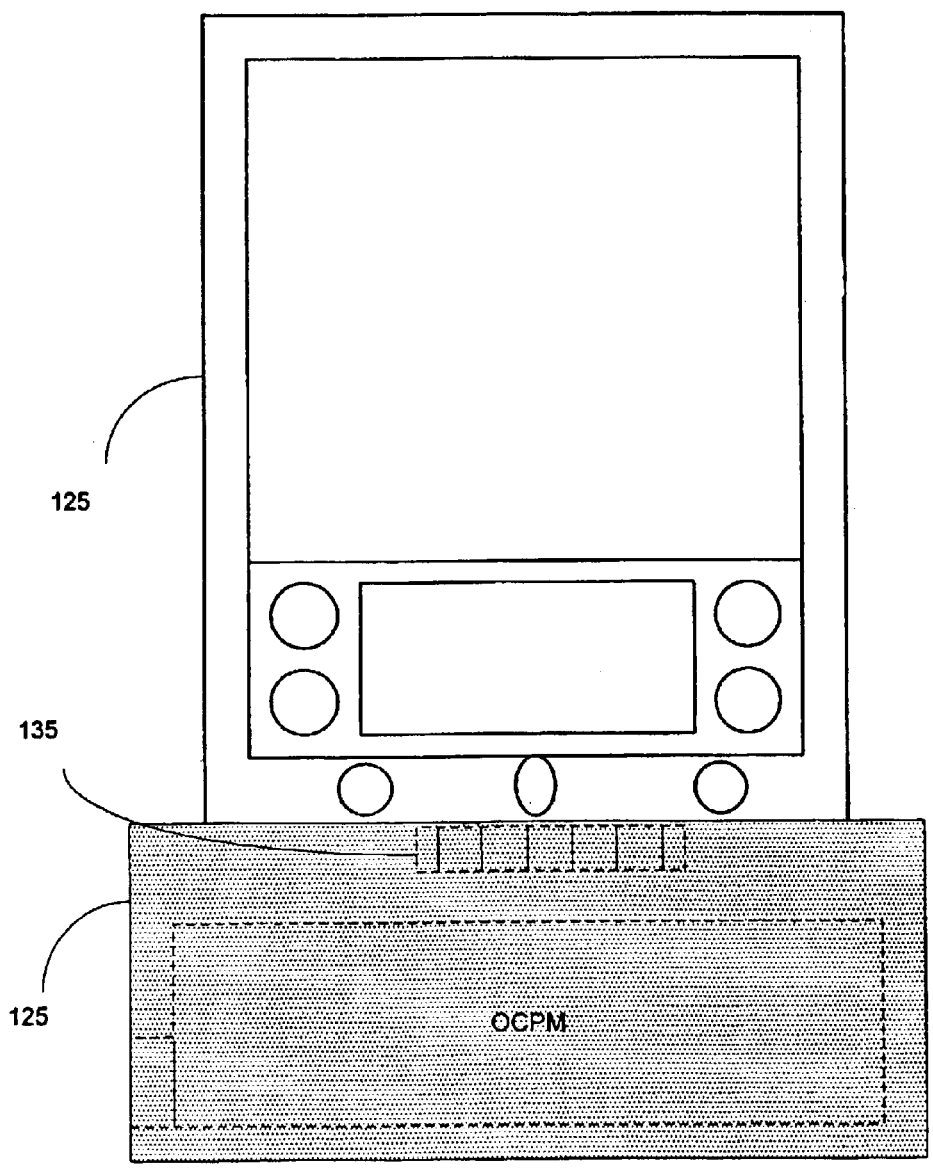
FIG. 1D is a front view of a third embodiment of a handheld optical spectrum analyzer of the present invention showing an alternate housing design.

Referring to the top and side views view of FIGS. 1A and 1D, respectively, in one embodiment a housing 110 is shaped to be held by a human hand. Housing 110 is also adapted to hold a PDA 125, which includes a display screen 127, a user input interface 129, and a signal interface 131. An optical spectrum analyzer 105 resides within housing 110 to analyze an optical input. In one embodiment, the optical spectrum analyzer 105 is configured to perform the function of an optical channel performance monitor (OCPM) (e.g., to measure power, wavelength, and signal to noise ratio of individual channels). Additionally, optical spectrum analyzer 105 may be used to form data to display a spectrum of power versus wavelength. Optical spectrum analyzer 105 preferably includes suitable optics, detectors, and, a spectral engine for analyzing optical characteristics (e.g., optical power versus wavelength) over a desired wavelength range. For telecommunication applications, the desired wavelength ranges typically correspond to defined channel-spectra with in wavelength bands, such as one or more wavelength channels in the C-band, L-band, or other bands. In one embodiment an additional signal connector is included to couple the optical spectrum analyzer 105 to another host, such as a conventional computer independent of the PDA.

Optical spectrum analyzer 105 requires a suitable power source. In one embodiment, a battery compartment 115 is preferably included in housing 110 to house batteries for powering the electronics of the compact optical spectrum analyzer 105. A suitable switch may be included to shut the power off when not in use. If desired, the power switch may be configured to turn on and off both the PDA and the optical spectrum analyzer. In an alternate embodiment, the optical spectrum analyzer is powered by the PDA. For example, some PDAs permit external devices to be powered from their expansion slots. This has the advantage of eliminating the need for separate batteries to power the optical spectrum analyzer. An optical port 120 in housing 110 is configured to permit an input light source to enter the optical spectrum analyzer. In one embodiment, optical port 120 is an optical fiber connector for receiving an optical fiber. A suitable PDA signal connector 135, such as a serial connector, is coupled to housing 110 and is shaped and positioned to engage the signal connector port of a PDA 125 when PDA 125 is mounted to housing 110. In one embodiment the interface between the PDA and the optical spectrum analyzer is a generic and portable interface, such as a standard RS232 interface, to facilitate using a variety of different types and brands of PDAs. Signal connector 135 permits a host PDA 125 to read data from optical spectrum analyzer 105. However, it will be understood that the signal coupling is bi-directional and that PDA 125 may also be used to input command/control signals to electronics within optical spectrum analyzer 105.

Any suitable mounting technique mat be used to detachably mount the PDA to the housing. However, in a preferred embodiment the PDA is demountably mounted, i.e., the PDA is fixed during use but may be removed from the housing as desired. For example, Velcro™ strips may be disposed on the back of the PDA and a surface of the housing to facilitate mechanical coupling. Additionally, one or more additional mounting features may be included in housing 110 to facilitate mounting and demounting of PDA 125 from housing 110. For example, a mechanical feature may be included to grasp or clamp a portion of the housing of the PDA. Referring to FIG. 1C, in an alternate embodiment, the housing includes spring-loaded clamps to hold the PDA in place in an operational mode. Alternatively, a portion of housing 110 may be shaped to support the PDA. For example, referring to FIG. 1D, in one embodiment the housing has a receptacle for receiving the serial port of the PDA with a friction fit.

In the assembled unit, PDA 125 receive data signals from optical spectrum analyzer 105 through signal connector 135. PDA 125 includes a software application to provide a display of optical parameters of interests, such as optical power per channel, wavelength, signal-to-noise ratio, or an optical spectrum. In one embodiment, PDA 125 also includes a data table of alarm values and generates an alarm if the optical characteristics of a channel are below acceptable levels. For example, an alarm may be generated if optical power level, wavelength, or optical signal to noise ratio (OSNR) are within deleterious ranges.

In one embodiment, PDA 125 includes an application for storing a data file for each optical test that is performed and for downloading this data file to other devices (e.g., using an infrared or cable data transfer capability of PDAs, such as those using the Palm™ operating system). Alternatively, the data file may be sent via electronic mail to a destination. It is preferable that each optical spectrum analyzer stores all of its settings and calibration data, since this permits the PDA to have a software application that is operable on more than one OCPM.

Referring to FIG. 1B, in one embodiment housing 110 includes an external computer port 185, such as a USB or RS-232 serial port. This permits the user the option to couple optical spectrum analyzer spectral data to an external host computer 190 using a signal cable 195. In one embodiment, port 185 is directly coupled to optical spectrum analyzer 105. In another embodiment, port 185 provides a data path to PDA 125. External host computer 190 may, for example, include graphical programs to display power, wavelength, signal to noise ratio, or an optical spectrum using the display of the external host computer. The ability to couple a host computer 190 to housing 110 provides several advantages. First, it permits the same optical spectrum analyzer 105 to be used as either a portable hand-held unit with a PDA host or as an optical spectrum analyzer coupled to an external host computer (e.g., a laptop or notebook computer). Second, in one embodiment port 185 is configured to permit data store in PDA 125 to be downloaded to host 190 via port 185, which may useful in applications for which it is desirable to only infrequently remove PDA 125 from housing 110 while also transferring data to host 190.

Figure 2A:
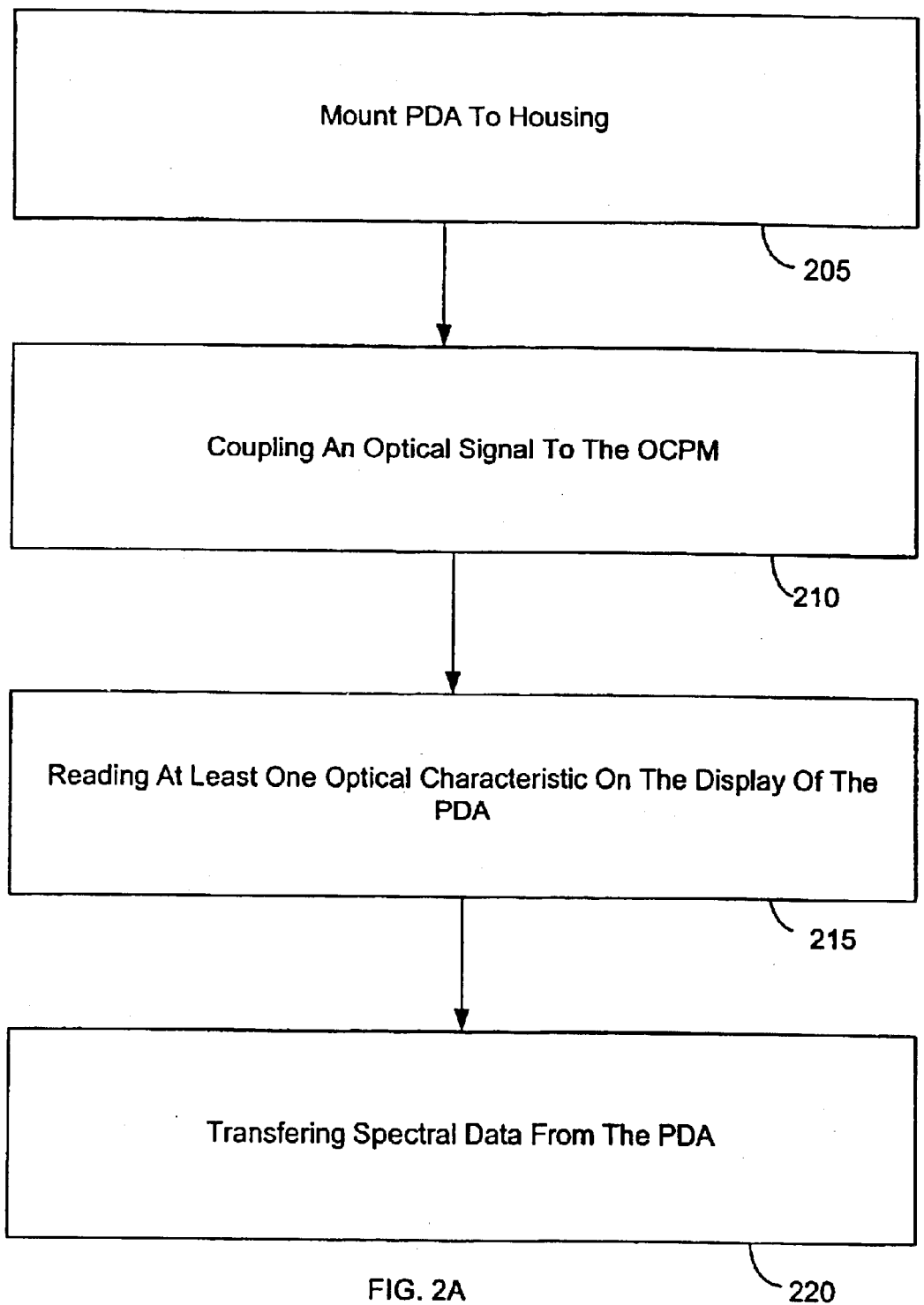
FIGS. 2A and 2B are flow charts of methods of operation.
Figure 2B:
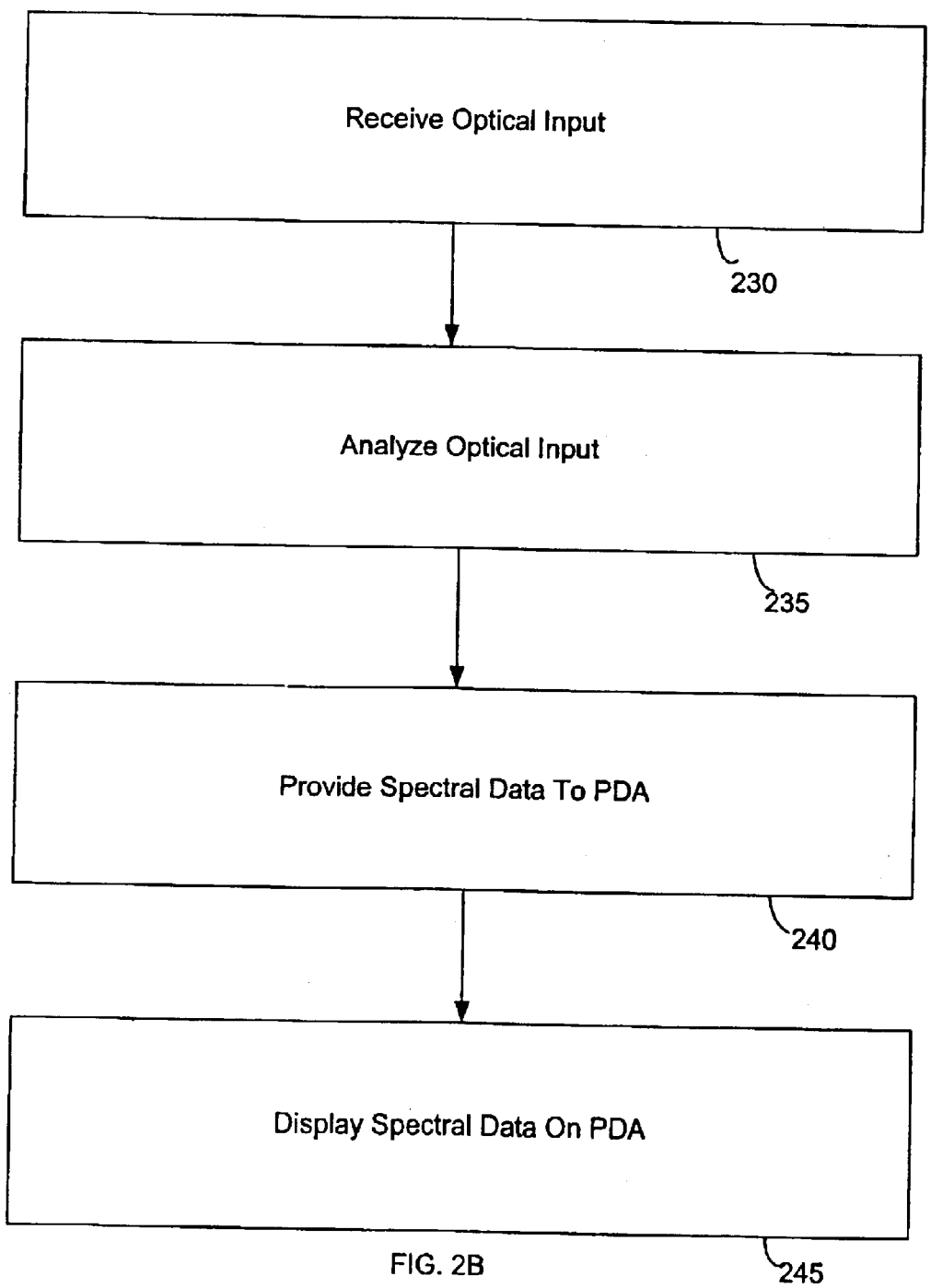

FIGS. 2A and 2B illustrate exemplary methods of use. FIG. 2A illustrates a method of use from the perspective of a user. Referring to FIG. 2A, in one embodiment a user mounts 205 the PDA to the housing. The user then couples 210 an optical signal to the optical spectrum analyzer. The user may then read 215 one or more optical characteristics on the display of the PDA. Alternatively, an audio output may also be provided, such as an alarm sound if an optical characteristic in unacceptable. The user may transfer 220 spectral data stored in the PDA to another computer or a network using the data transfer function of the PDA. FIG.

2B illustrates a method of use in regards to events occurring within the assembled handheld unit. The handheld unit receives an optical input 230. The unit analyzes, the optical input 235. Spectral data is provided 240 to the PDA. The PDA displays 245 characteristics of the spectral data.

In a preferred embodiment, the optical spectrum analyzer 105 is configured to function as both an OCPM and OSA. For example, the optical spectrum analyzer may be implemented as a compact module with sufficient resolution to measure optical power, wavelength, and signal-to-noise ratio of individual channels and to function as an optical spectrum analyzer for optical wavelength channels having a channel spacing of 100 GHz or less. The minimum channel spacing depends on the optics, and may, for example, be reduced to 50 GHz by appropriate selection of the optics.

Figure 3:
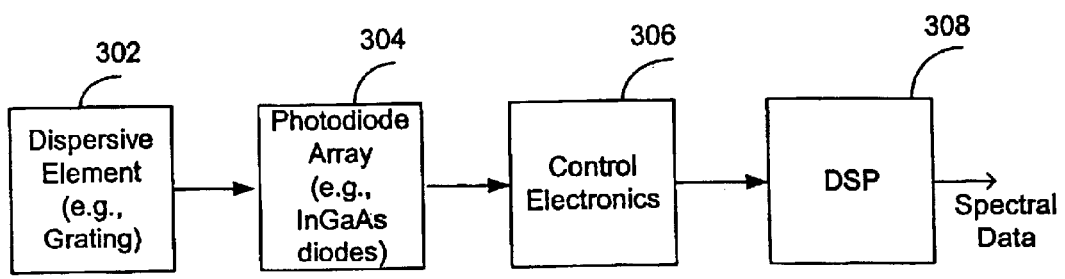
FIG. 3 is a block diagram of the components of a compact optical spectrum analyzer for use in a handheld optical analyzer.

FIG. 3A is a block diagram of the components of one embodiment of an optical spectrum analyzer 105 capable of functioning as both an OCPM and OSA. A grating or other spectrally dispersive element 302 is used to disperse input light. The grating spatially spreads out the input light over the array of photodiodes 304e as function of wavelength. Control electronics 306 read the amplitude of each detector and convert the amplitude to digital data. In one embodiment, control electronics 306 includes an analog-to-digital (A/D) converter. The control electronics may also include a field programmable gate array (FPGA) to provide a logical interface between the ADC and a digital signal processor ASP) 308, a serial RS232 interface, and the control signals for the photodiodes 304. Alternatively, an ASIC may be used in place of a FPGA. DSP 308 includes an algorithm for converting the data into spectral information. For example, the DSP may use a curve fitting algorithm to estimate the optical spectrum that takes into account the optical power intercepted by each detector over a finite wavelength range to estimate a continuous spectrum from the raw data associated with each detector of the array.

Sensors Unlimited, Inc., a division of the Finisar Corporation of Sunnyvale, Calif., sells photodiode arrays integrated with associated electronics. To achieve a high spectral resolution, the number of array pixels and the pitch (inter-element array separation) are selected in combination with the grating optics and separation between the array and the grating to achieve a desired optical wavelength resolution. Typical array sizes, correspond to pixel numbers of 256, 512, or 1024 pixels. Individual InGaAs detectors can detect light over a range of wavelengths between about 800 nanometers to about 1800 nanometers.

Figure 4:
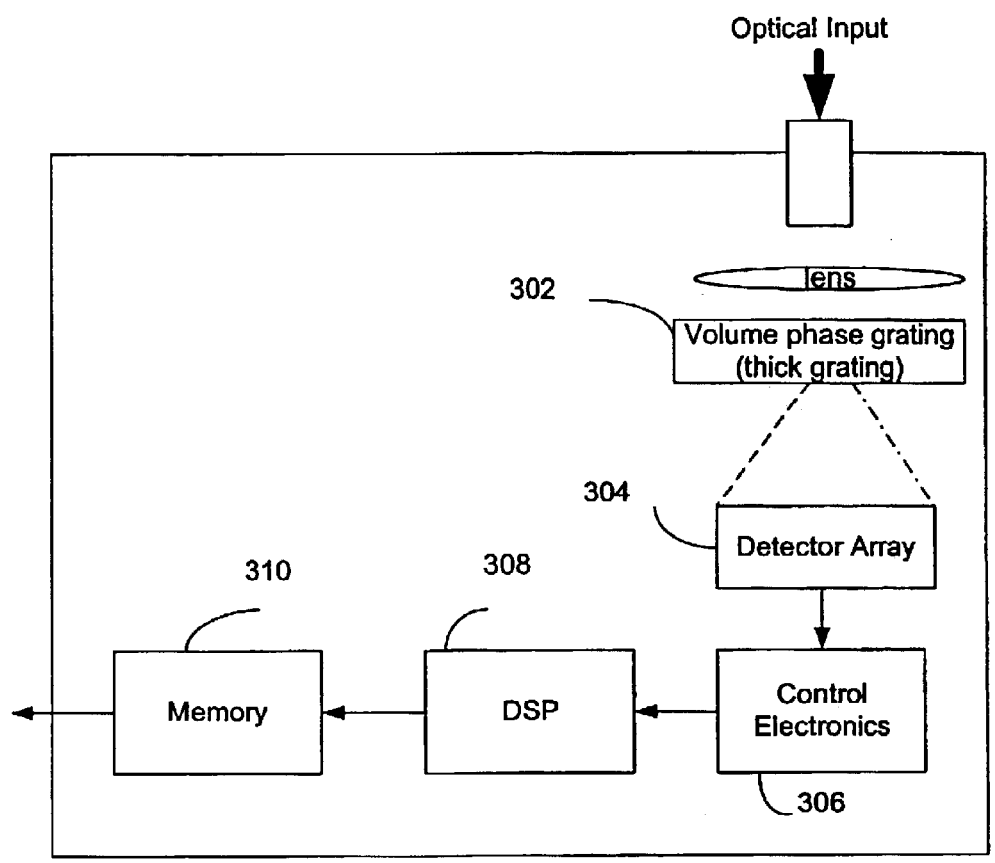
FIG. 4 shows the components of a preferred compact optical spectrum analyzer.

A complete OCPM module 400 similar to that shown in FIG. 4 may be purchased from BaySpec, Inc. of Fremont, Calif. Bayspec's Intelliguard™ includes a volume phase grating (e.g., a thick grating) packaged with a detector array and associated electronics designed by Sensors Unlimited. The volume phase grating has a high diffraction efficiency and comparatively low insertion loss. Additional memory 310 is included that facilitates data read out of both raw and processed data to the host or to the PDA. The Intelliguard™ is approximately 60 mm×68 mm×15 mm, which is smaller in area and thickness than many PDAs. It is capable of OCPM measurements in C-Band and L-band channels with sufficient resolution to measure optical power levels, wavelength, and OSNR of optical channels with up to 50 GHz channel spacing. The resolution is also sufficient for it to be used to calculate information for displaying an optical spectrum.

One benefit of the present invention is; that it may be used as a portable handheld unit. The display of the PDA may be used as the output interface for displaying optical characteristics, such a power levels of selected channels, wavelength, optical-signal-to-noise ratios, or an optical spectrum. Additionally, the control interface of the PDA (e.g., its buttons and text input interface) may be used as the control interface. This makes the OCPM and OSA capability of the present invention attractive in a variety of applications, such as field testing of optical networks or in test benches where space is at a premium.

Another benefit of the present invention is that PDA 125 provides a comparatively low-cost user host and provides a user interface with a high level of functionality. PDAs have sufficient memory, display, and processing resources to provide the function of a host computer. The price of a PDA varies depending upon model, but is typically lower than a personal computer. Moreover, in embodiments in which PDA 125 is demountably mounted, the PDA may be used for other applications when not in use in the handheld analyzer.

Additionally, the functionality of the PDA may be leveraged to provide a range of functions at a low cost. PDAs, such as those using the Palm® operating system (OS), have software applications built into them permit a wide variety of data transfer functions, such as IrDa ports for beaming information, cradle sockets for synchronizing data, or wireless modems for sending/receiving data. In one embodiment, PDA 125 is placed in a suitable cradle to transfer data. For PDAs with an IrDa port, the IrDa port may be used to beam the data. Alternatively, for PDAs with a wireless modem, the data may be wirelessly transferred. If desired, a suitable data connector, such as a serial port to USB converter, may be included in housing 110 to facilitate data transfer from PDA 125. It will also be understood that the present invention may utilize other functions of a PDA, such as a LCD touch screen, function buttons, backup capability, and commercially available software and hardware accessories and modules.

While the present invention has been discussed in detail in regards to a detachably mounted PDA, in an alternate embodiment, the PDA is permanently attached to the housing. However, for this embodiment a means for providing power to the PDA is required. For example, power could be provided from the battery compartment of the housing. For this embodiment, an IrDa port on the PDA could be used to sync it with a host computer or network.

It will also be understood that the present invention may be practiced with PDAs having an extension slot or module. Some PDAs, such as those manufactured by Handspring Inc., of Mountain View, Calif., have an expansion slot for receiving expansion modules. Data signals may be communication to such PDAs through the signal connectors within the expansion slot by using an appropriate signal connector. For this case, signal connector 135 may be shaped to engage appropriate signal connections within the expansion slot instead of the serial port connector of the PDA.

While particular embodiments and applications of the present invention have been illustrated and described, it is to be understood that the invention is not limited to the precise construction and components disclosed herein anti that various modifications, changes and variations which will be apparent to those skilled in the art may be made in the arrangement operation and details of the method and apparatus of the present invention disclosed herein without departing from the spirit and scope of the invention as defined in the appended claims.

What is claimed is:

1. A handheld unit for analyzing optical power characteristics of an optical input in an optical network, comprising:

a housing shaped to be held by a human hand, the housing configured to demountably mount a personal digital assistant to the housing;

a signal connector coupled to the housing and configured to electrically connect with the personal digital assistant;

an optical port disposed in the housing for receiving the optical input received over the optical network coupled to the optical port; and an optical spectrum analyzer disposed within the housing to analyze the optical input at a plurality of wavelengths and output spectral data to a mounted personal digital assistant via the signal connector.

2. The handheld unit of claim 1, wherein the optical spectrum analyzer comprises:

an optically dispersive element receiving the optical input;

an array of photodetectors receiving an output of the dispersive element;

electronics for converting an electrical output of each photodetector to data indicative of an intensity of light at each of the photodetectors; and a processor to spectrally analyze the data and output spectral data to the signal connector.

3. The handheld unit of claim 1, wherein the spectral data includes the wavelength of at least one optical channel.

4. The handheld unit of claim 1, wherein the spectral data includes the average optical power for at least one optical channel.

5. The handheld unit of claim 1, wherein the spectral data includes the optical signal to noise ratio of at least one wavelength channel.

6. The handheld unit of claim 1, further comprising: a second signal connector disposed in the housing for coupling the spectral data to an external host computer.

7. The handheld unit of claim 1, further comprising a battery compartment disposed within the housing adapted to supply power to the optical spectrum analyzer.

8. The handheld unit of claim 1, wherein the optical spectrum analyzer is adapted to function as an optical channel performance monitor.

9. A handheld unit for analyzing optical, power characteristics of optical input received from an optical network, the handheld unit comprising:

a housing shaped to be held by a human hand;

a signal connector coupled to the housing;

a personal digital assistant mounted to the housing;

an optical port disposed in the housing for receiving the optical input, the optical port connected with the optical network; and an optical spectrum analyzer disposed within the housing to analyze the optical input and output spectral data to the personal digital assistant via the signal connector.

10. The handheld unit of claim 9, wherein the optical spectrum analyzer comprises:

an optically dispersive element receiving the optical input through the optical port;

an array of photo detectors receiving an output of the dispersive element, electronics for converting an electrical output of each photo detector to data indicative of the intensity of light at each of the photodetectors, and a processor to spectrally analyze the data and output spectral data to the signal connector.

11. The handheld unit of claim 10, wherein the optical spectrum analyzer is an optical channel performance monitor.

12. The handheld unit of claim 9, wherein the personal digital assistant includes an IrDa port and the personal digital assistant is configured to transfer the spectral data using the IrDa port.

13. The handheld unit of claim 9, wherein the personal digital assistant includes a software application for displaying data on the personal digital assistant.

14. The handheld unit of claim 13, wherein the personal digits assistant displays an optical spectrum of the optical input.

15. The handheld unit of claim 13, wherein the personal digital assistant displays an average optical power level of at least one wavelength channel.

16. The handheld unit of claim 13, wherein the personal digital assistant displays an optical signal to noise ratio.

17. The handheld unit of claim 13, wherein the personal digital assistant is configured to generate an audio or visual alarm if an optical characteristic is out of bounds of a pre-selected range.

18. The handheld unit of claim 13, wherein the personal digital assistant is configured to store the spectral data.

19. The handheld unit of claim 18, wherein the personal digital assistant is configured to transfer the spectral data to another computer or network.

20. The handheld unit of claim 19, wherein the personal digital assistant includes an IrDa port and the personal digital assistant is configured to transfer the spectral data rising the IrDa port.

21. The handheld unit of claim 19, wherein the personal digital assistant is configured to transfer the spectral data using a serial port of the personal digital assistant.

22. The handheld unit of claim 9, further comprising a second signal connector disposed on the housing for coupling the spectral data to an external host computer.

23. A handheld optical analyzer for analyzing an optical input received from an optical network, comprising:

optical spectrum analyzer means disposed within a housing for generating spectral data from an optical input, the optical input received over the optical network connected with the optical spectrum analyzer means;

personal digital assistant means for providing a host computer functionality to the optical spectrum analyzer means; and means for mounting the personal digital assistant to the housing.

24. A handheld optical analyzer for analyzing an optical input, comprising:

a housing shaped to be held by a human hand;

an optical port disposed in the housing and connected with an optical network, the optical port receiving the optical input from the optical network;

an optical channel performance monitor disposed within the housing for analyzing the optical characteristics of a plurality of optical wavelength channels of the optical input; and a personal digital assistant communicatively coupled to the optical channel performance monitor by a signal connector;

the personal digital assistant acting as the host computer for the optical channel performance monitor.

25. The handheld optical spectrum analyzer of claim 24, wherein a user interface of the personal digital assistant is used to display at least one optical characteristic of the optical input selected from the group consisting of an optical power level, an optical wavelength, an optical signal to noise ratio, and an optical spectrum.

26. The handheld optical spectrum analyzer of claim 24, further comprising: a signal port disposed in the housing for coupling the optical channel performance monitor to an external host computer, whereby the external host computer may serve as the host computer for the optical channel performance monitor.

27. The handheld unit of claim 24, wherein the optical channel performance monitor comprises:
   an optically dispersive element receiving the optical input;
   an array of photo detectors receiving the output of the dispersive element,
   electronics for converting the electrical output of each photo detector to data indicative of the intensity of light at each of the photodetectors, and
   a process to spectrally analyze the data and output spectral data to the signal connector.

28. A method of analyzing an optical input received from an optical network, the method comprising:
   mounting a personal digital assistant to a housing of a handheld optical analyzer so that the personal digital assistant receives spectral data from the optical spectrum analyzer, wherein the handheld optical analyzer has a port;
   coupling the optical network to the port to direct the optical input from the optical network to the optical spectrum analyzer; and
   reading at least one optical power characteristic of the optical input on a display of the personal digital assistant, wherein the personal digital assistant receives the at least one optical power characteristic through a signal connector of the handheld optical analyzer.

29. The method of claim 28, wherein the at least one optical power characteristic includes at least one characteristic selected from the group consisting of an optical spectrum, an optical power level of at least one optical channel, an optical signal to noise ratio of at least one channel, and an alarm condition for at least one channel.

30. The method of claim 28, further comprising:
   transferring the spectral data to another device.

31. The method of claim 28, further comprising:
   storing the at least one optical power characteristic; and
   transferring the at least one optical power characteristic to another device.

32. The method of claim 28, wherein the optical spectrum analyzer is an optical channel performance monitor.

* * * * *

UNITED STATES PATENT AND TRADEMARK OFFICE
CERTIFICATE OF CORRECTION

| | |
|---|---|
| PATENT NO. | : 6,975,395 B1 |
| APPLICATION NO. | : 10/318286 |
| DATED | : December 13, 2005 |
| INVENTOR(S) | : Gentieu et al. |

It is certified that error appears in the above-identified patent and that said Letters Patent is hereby corrected as shown below:

Cover Page
Item (56), References Cited, U.S. PATENT DOCUMENTS, add the following reference: --6,704,509   3/004 Yang et al. ............................................398/34--
Item (56), References Cited, OTHER PUBLICATIONS, add the following references:
--Article entitled "LD-Series InGaAs Linear Photodiode Arrays" by Sensors Unlimited, Inc., April 1, 2002
Article entitled "Optical Channel Performance Monitors" by Danny Yu ad William Yang in association with Bay Spec, Inc., February 20, 2002--

Column 1
Line 50, change "CPM" to --OCPM--
Line 56, after "bulk" insert --of--

Column 3
Line 12, change "ID" to --1B--
Line 29, change "with in" to --within--
Line 64, change "mat" to --may--

Column 4
Line 15, change "receive" to --receives--
Line 54, before "useful" insert --be--

Column 5
Line 21, change "304$e$" to --304--
Line 24, change "includes" to --include--
Line 28, change "ASP)" to --(DSP)--
Line 49, remove "400"

Column 6
Line 2, change "such a" to --such as--
Line 22, before "permit" insert --that--
Line 58, change "anti" to --and--

Column 8
Line 31, change "rising" to --using--
Line 43, change "means;" to --means, wherein the housing is shaped to be held by a human hand;--

UNITED STATES PATENT AND TRADEMARK OFFICE
CERTIFICATE OF CORRECTION

PATENT NO. : 6,975,395 B1
APPLICATION NO. : 10/318286
DATED : December 13, 2005
INVENTOR(S) : Gentieu et al.

It is certified that error appears in the above-identified patent and that said Letters Patent is hereby corrected as shown below:

Column 9
Line 26, change "a port;" to --an optical port disposed in the housing wherein the housing is shaped to be held by a human hand;--

Column 10
Line 1, before "port" insert --optical--

Signed and Sealed this

Eighteenth Day of December, 2007

JON W. DUDAS
*Director of the United States Patent and Trademark Office*